United States Patent
Heiss et al.

(10) Patent No.: US 7,180,859 B1
(45) Date of Patent: *Feb. 20, 2007

(54) METHOD FOR REMOVAL OF ATM CELLS FROM AN ATM COMMUNICATIONS DEVICE

(75) Inventors: Herbert Heiss, Unterhaching (DE); Raimar Thudt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/673,435

(22) PCT Filed: Mar. 23, 1999

(86) PCT No.: PCT/EP99/01986

§ 371 (c)(1), (2), (4) Date: Oct. 18, 2000

(87) PCT Pub. No.: WO99/63716

PCT Pub. Date: Dec. 9, 1999

(30) Foreign Application Priority Data

May 29, 1998 (DE) ............................. 98 109 876

(51) Int. Cl.
*H04L 12/26* (2006.01)

(52) U.S. Cl. .................................. 370/235

(58) Field of Classification Search ............... 370/229, 370/232, 233, 235, 395.1, 395.7, 412–414, 370/369; 709/232, 235
See application file for complete search history.

(56) References Cited

U.S. PATENT DOCUMENTS

| | | | | |
|---|---|---|---|---|
| 5,838,677 A | * | 11/1998 | Kozaki et al. ............ | 370/389 |
| 5,901,147 A | * | 5/1999 | Joffe ........................ | 370/412 |
| 5,936,959 A | * | 8/1999 | Joffe ........................ | 370/397 |
| 5,999,518 A | * | 12/1999 | Nattkemper et al. ....... | 370/258 |
| 6,044,079 A | * | 3/2000 | Calvignac et al. ..... | 370/395.32 |

(Continued)

FOREIGN PATENT DOCUMENTS

EP      0 596 200       5/1994

(Continued)

OTHER PUBLICATIONS

Cheon Early selective packet discard for alternating resource access of TCP over ATM-UBR□□Local Computer Networks, 1997. Proceedings., 22nd Annual Conference on , Nov. 2-5, 1997 □□pp. 306-316.*

*Primary Examiner*—Dmitry Levitan
(74) *Attorney, Agent, or Firm*—Morrison & Foerster LLP

(57) ABSTRACT

The invention discloses removal of ATM cells from an ATM communications device. A first algorithm is provided by means of which, with the exception of a first and a last ATM cell in a frame, all newly arriving cells in the frame are removed. A second algorithm is provided by means of which all the ATM cells in a frame, from a first cell to a last cell, are removed on arrival in a queue from the ATM communications device. At a start of a transmission process, a user indicates a maximum number of ATM cells per frame, and the ATM cells using the number are transmitted when the maximum number is exceeded, the associated frame is discarded or the first algorithm is used. The invention solves this problem by defining rules whose application results in this method now being used only to a very limited extent.

6 Claims, 3 Drawing Sheets

```
IF      (CLP=0)                    //comment: unmarked frame
THEN IF     (first cell of frame)       // e.g. Current_frame_length=0
        THEN IF    {Logical_queue_length>S_PPD_0-MFS)OR
                   [(Logical_queue_length>S_EPD_0)AND
                   (Buffer_check_0=TRUE)]
              THEN discard_cell(P_cell)
                   IF    end_of_frame(P_cell)=FALSE
                   THEN FPD_flag=TRUE
              ELSE append_cell(P_cell)

IF     (subsequent cell of frame) //e.g. Current_frame_length >0
     THEN IF    end_of_frame(P_cell)
           THEN append_cell(P_cell)
           ELSE IF    (Logical_queue_length≥S_PPD_0-1)OR
                      [(Logical_queue_length>S_EPD_0)AND
                      (Buffer_check_0=TRUE)]OR
                      (Current_frame_length>MFS-1)
                 THEN discard_cell(P_cell)
                      IF    remove_last_frame
                      THEN FPD_flag=TRUE
                      ELSE PPD_flag=TRUE
                 ELSE append_cell(P_cell)
```

U.S. PATENT DOCUMENTS

| | | | |
|---|---|---|---|
| 6,128,278 A * | 10/2000 | Joffe et al. | 370/229 |
| 6,219,728 B1 * | 4/2001 | Yin | 710/52 |
| 6,246,687 B1 * | 6/2001 | Siu | 370/395.71 |
| 6,345,037 B2 * | 2/2002 | St-Denis et al. | 370/230 |
| 6,463,476 B1 * | 10/2002 | Milles | 709/235 |
| 6,529,474 B1 * | 3/2003 | Bonneau et al. | 370/230 |
| 6,618,382 B1 * | 9/2003 | Divivier et al. | 370/395.5 |
| 6,625,120 B1 * | 9/2003 | Pillar et al. | 370/230 |
| 6,657,955 B1 * | 12/2003 | Bonneau et al. | 370/229 |
| 6,671,258 B1 * | 12/2003 | Bonneau | 370/235 |
| 6,754,206 B1 * | 6/2004 | Nattkemper et al. | 370/369 |

FOREIGN PATENT DOCUMENTS

| | | |
|---|---|---|
| EP | 0 744 850 | 11/1996 |
| WO | WO 96/29806 | 9/1996 |

* cited by examiner

FIG 1

```
IF FPD_flag=TRUE
THEN    IF end_of_frame(P-cell)
        THEN FPD_flag=FALSE
        discard_cell(P_cell)
ELSE    IF PPD_flag=TRUE
        THEN IF end_of_frame(P_cell)
                THEN append_cell(P_cell)
                     PPD_flag=FALSE
                ELSE discard_cell(P_cell)
        ELSE    decide_cell(P_cell)
```

FIG 2A

```
IF      (CLP=0)                              //comment: unmarked frame
THEN IF    (first cell of frame)             // e.g. Current_frame_length=0
     THEN IF   {(Logical_queue_length>S_PPD_0-MFS)OR
                [(Logical_queue_length>S_EPD_0)AND
                 (Buffer_check_0=TRUE)]
               THEN discard_cell(P_cell)
                    IF   end_of_frame(P_cell)=FALSE
                    THEN FPD_flag=TRUE
               ELSE append_cell(P_cell)

IF   (subsequent cell of frame)  //e.g. Current_frame_length >0
          THEN IF   end_of_frame(P_cell)
               THEN append_cell(P_cell)
               ELSE IF   {(Logical_queue_length≥S_PPD_0-1)OR
                          ((Logical_queue_length>S_EPD_0)AND
                           (Buffer_check_0=TRUE))OR
                          (Current_frame_length>MFS-1)
                         THEN discard_cell(P_cell)
                              IF   remove_last_frame
                              THEN FPD_flag=TRUE
                              ELSE PPD_flag=TRUE
                         ELSE append_cell(P_cell)
```

FIG 2B

```
IF    (CLP=1)                                    //comment: marked frame
THEN IF    (first cell of frame)    //e.g. Current_frame_length=0
     THEN IF    (Logical_queue_length≥S_PPD_1)OR
                {(Logical_queue_length>S_EPD_1)AND
                (Buffer_check_1=TRUE)}
          THEN discard_cell(P_cell)
               IF    end_of_frame(P_cell)=FALSE
               THEN FPD_flag=TRUE
               ELSE append_cell(P_cell)

IF    (subsequent cell of frame) //e.g. Current_frame_length>0
     THEN IF    end_of_frame(P_cell)
          THEN append_cell(P_cell)
          ELSE IF    (Logical_queue_length≥S_PPD_1-1)OR
                     {(Logical_queue_length>S_EPD_1)AND
                     (Buffer_check_1=TRUE)}OR
                     (Current_frame_length>MFS-1)
               THEN discard_cell(P_cell)
                    IF    remove_last_frame
                    THEN FPD_flag=TRUE
                    ELSE PPD_flag=TRUE
               ELSE append_cell(P_cell)
```

METHOD FOR REMOVAL OF ATM CELLS FROM AN ATM COMMUNICATIONS DEVICE

CLAIM FOR PRIORITY

This application claims priority to International Application No. PCT/EP99/01986, which was published in the German language on Dec. 9, 1999, which claims the benefit of priority to European Application No. 98109876.7 which was filed in the European language on May 29, 1998.

TECHNICAL FIELD OF THE INVENTION

The invention relates to a method for a removal of ATM cells from an ATM communications device.

BACKGROUND OF THE INVENTION

In conventional packet communications systems, a packet has a comparatively large and variable length. One system for transmitting information in packets with fixed, predetermined lengths is referred to as the ATM (Asynchronous Transfer Mode) system. Such a system allows voice, video and data signals to be processed and transmitted in the same way. The individual packets are normally called cells. The cells each contain a cell header, whose information allows switching and/or assignment of the respective cell. In ATM communications devices, in particular communications network devices, high-speed and broadband transmission is possible at a transmission rate of more than 150 Mb/s.

One problem with ATM communications devices is the level of the transmission rate on a transmission path when a jam of ATM cells has formed there. This problem is described in detail in the German Patent Application 19810058.2, corresponding to U.S. Ser. No. 09/623,775, filed Sep. 8, 2000. This refers to ATM systems in which a plurality of ATM cells are in each case assigned to a common frame. These frames are data packets of variable length, in a relatively narrow sense. If, for example, a cell in such a frame is lost or has been damaged, it is undesirable for the remaining cells in the same frame to be transmitted further over a transmission path of an ATM device, since the complete information in the frame would no longer be received at the end of the transmission path. The ATM system would thus be unnecessarily loaded dynamically. Particularly when a jam occurs on the transmission path, it is necessary to remove the remaining cells in the frame as quickly and effectively as possible.

It has thus been proposed for ATM cells in a specific frame to be removed in each case when an individual ATM cell arrives at the end of a queue. Such queues are used, in particular, to control a sequence of ATM cells at the end and/or at the start of a transmission path. According to a method which is described in the above-mentioned Patent Application and which is called Partial Packet Discard (PPD in the following text), the first and, if present, other cells in the frame which are already located in the queue are not removed, but only all the newly arriving cells in the frame, with the exception of the last cell of the frame. The PPD method has the disadvantage that at least the first and the last cell in the frame still have to remain in the queue.

The abovementioned Patent Application discloses a further method, according to which all the cells in a frame, from the first cell to the last cell, are removed from the ATM communications device upon arrival in a queue. This method, which is called Early Packet Discard (EPD in the following text), has the advantage that no residual cells remain from a damaged frame, or from a frame which is to be removed for other reasons, and the maximum possible space is thus available for other ATM cells. However, the EPD method cannot be applied to frames whose first cell has already been added to the queue.

The transmission of information using the Internet is an example of communication networks via which information is transmitted in packets with a comparatively large and variable length. The Internet protocol TCP/IP is used in this case, which supports the transmission of frames with a variable length. In practice, these networks have an interface to ATM networks. For this reason, the information contained in data packets has to be converted to ATM cells, and vice versa.

For this purpose a frame initial code, for example, is stored which denotes that ATM cell immediately in front of the first ATM cell of the frame in the queue. This information normally exists in the cell header of the last cell of the frame, namely, as a rule, in the so-called AAU bit in the cell type field (payload type field) of the cell header. Furthermore, the ATM cells are numbered so that, in the end, the majority of the ATM cells can be assigned to a data packet.

German Patent Application 198 100 58.2 describes a further method for how ATM cells can be removed when overlaod situations occur in a frame. This method, which is also called the LPD method, is particularly useful when a decision has been made to discard the second part of the frame while the first part is still located in the queue in the ATM system. In this case, the first part of the frame is removed from the queue, and the remaining cells are dealt with in the same way as in the EPD method. However, the problem arises here of inefficient handling of the cells in an overload situation.

SUMMARY OF THE INVENTION

The invention provides a way of handling cells efficiently in an overload situation.

According to the method of the invention for removal of ATM cells from an ATM communications device, a plurality of ATM cells are provided, a plurality of which are in each case assigned to a common frame and which are stored in connection-specific queues. A first algorithm is provided by means of which, with the exception of a first and last ATM cell in a frame, all newly arriving cells in the frame are removed. A second algorithm is provided by means of which all the ATM cells in a frame, from a first cell to a last cell, are removed on arrival in a queue from the ATM communications device. At a start of a transmission process, a user indicates a maximum number of ATM cells per frame, and the ATM cells using the number are transmitted when the maximum number is exceeded, the associated frame is discarded or the first algorithm is used.

An advantageous feature of the invention is, in particular, that rules are defined whose application results in the PPD method now being used to only a very limited extent.

The invention will be explained in more detail in the following text with reference to an exemplary embodiment.

BRIEF DESCRIPTION OF DRAWINGS

FIG. 1 shows the first part of the algorithm which deals with the cells when cells arrive;

FIG. 2A shows the second part of the algorithm, which describes a decision function, on the basis of which the cells are discarded.

FIG. 2B shows an algorithm, which describes a decision function for low-priority cells.

DETAILED DESCRIPTION OF THE INVENTION

Although various minor changes and modifications might be proposed by those skilled in the art, it will be understood that our wish is to include within the claims of the patent warranted hereon all such changes and modifications as reasonable come within our contribution to the art.

The invention is based on the assumption that ATM cells are fed to queues in an ATM communications device. Some of the cells are discarded, but the remaining cells leave the queues at a later time. Each connection has a specific maximum frame size MFS, which is measured in cells and which depends on the connection. Furthermore, it is assumed that the CLP bit in the cell type field (payload type field) of the cell header of the ATM cell is evaluated in the ATM node. The user can send information in high-priority and low-priority frames. The cells in the high-priority frames have CLP=0 (not marked), while the cells with low-priority frames have CLP=1 (marked).

In all the connections under considerations, it is assumed that the associated cells are organized in frames, with the AAU bit being set in the payload type field of the header of the last cell in the frame. All the cells should receive application-related information. Furthermore, all the ATM cells which are stored in queues should have queue-specific markings QID with the queues themselves being organized on a connection-specific basis. The queues are designed as a FIFO queue, in the form of an ordered list of ATM cells. identification, which is denoted P_cell. In detail, the operations are:

Cell operations:
The following operations are carried out with ATM cells to which a valid cell identification number P_cell is assigned. In this case:

| | |
|---|---|
| end_of_frame (P_cell) | is set to the value TRUE when the end of the frame is reached, otherwise, this variable is set to the value FALSE |
| Discard_cell (P_cell) | discards cells having the identification number P_cell |
| Decide_cell (P_cell) | designates the algorithm, as will be explained in more detail further below. |

Operations on the queue data structure:
The following operations can be carried out in the queue:

| | |
|---|---|
| append_cell (P_cell) | inserts the identification number P_cell at the end of a queue |
| remove_last_frame | the LPD algorithm discards all the cells in the frame in question the variable returns the value TRUE if the LPD algorithm can be applied to the connection, otherwise the value FALSE. |

Operation in the buffer contents:
The following operations can be carried out in the buffer contents:

| | |
|---|---|
| Buffer_check_0 | returns the value TRUE when the buffer contents indicate that high-priority frames (CLP = 0) should be discarded otherwise, FALSE is returned |
| Buffer_check_1 | returns the value TRUE when the buffer contents indicate that low-priority frames (CLP = 1) should be discarded otherwise, FALSE is returned |

Data structures in a queue:
There is an identification number QID for each connection and the queue associated with it. This is used for storing the following data:

indication as to whether the variable "full packet discard" can be applied to the cells in the present frame (FPD_flag). This is equivalent to the statement that the LDP or EPD algorithm is used.

indication as to whether the PPD algorithm is applied to the cells in the present frame (PPD_flag).

the variable "logical queue length" denotes a cell counter which indicates the present number of cells in the queue.

the variable S_EPD_0 denotes the fixed threshold of a queue for application of the EPD algorithm to low-priority cells the variable MFS denotes the maximum frame size the variable Current_frame_length denotes a cell counter which is incremented by 1 for non-discarded cells of the connection. The variable is reset when the last cell in a frame arrives.

Global constants:
The following global constants are used:

the constant S_PPD_0 denotes a fixed upper limit for the queue (for all QIDs).

the constant S_EPD_1 denotes the fixed threshold for early packet discard for CLP1 cells (for all QIDs)

In other variants of the algorithm, the global constants may differ for different groups of connections, or they may be connection-specific.

The following initial values are assigned:

FPD_flag=FALSE

PPD_flag=FLASE

Current_frame_length=0

Furthermore, the following relationships apply to the abovementioned constants:

S_EPD_1>0

S_PPD_1=1S_EPD_1+MFS

S_EPD_0>S_PPD_1

S_PPD_0>S_EPD_0+MFS

The method according to the invention consists overall of 2 parts. In the first part, the algorithm starts to run when cells arrive, while in the second part a decision algorithm is controlled.

FIG. 1 shows the algorithm which is run when an ATM cell arrives.

According to this, the FPD_flag is checked first of all. If the FPD_flag has assumed the value TRUE, the cell is rejected. If the cell was the last cell in the frame, the FPD algorithm is not used when the next cells arrive from the same connection. If the FPD_flag has assumed the value FALSE, the use of the PPD algorithm is checked. If the PPD algorithm is used, that cell which does not represent the last cell in a frame is always rejected. Otherwise, the cell is transferred to the queue, and the PPD algorithm is not used when a cell next arrives. When the PPD algorithm is not used, however, other acceptance algorithms can be controlled for a cell. For example, the function append_cell can be used, or the cell can be rejected.

FIG. 2 shows the decision algorithm. In this case a distinction is drawn between low-priority cells and high-priority cells.

For high-priority cells (CLP=0), it can be said that:

If the cell in question is the first cell in the frame, a decision must first be made as to whether this cell and the remaining cells in the frame are discarded, or whether the cell is added to the queue. Reasons for discarding the frame are, for example, that the queue has less free cell memory space available than the amount MFS. Other reasons may be that the length of the queue is above the EPD_0 threshold and the status of the buffer store indicates at the same time that high-priority frames should be discarded.

If the cell is the only cell in the frame, it simultaneously represents the end of the frame and the FPD_flag is not set, otherwise it is set.

If the cell is not the first cell in the frame, one or more cells of the frame are added to the queue. Otherwise, the decide_cell function is not used. If it is the last cell in the frame, it is accepted in each case and added to the queue. If it is not the last cell in the frame, the cell is discarded if the following condition is satisfied:

At most one free memory space for a cell must be present in the queue or if the current length of the queue is above the threshold EPD_0 and the buffer store indicates that high-priority frames should be discarded or if the previous length of the frame is greater than the value MFS−1. The reason for a free cell is to reserve sufficient memory space for the last cell in the frame. The reason for the value MFS−1 is that the cell is not the last cell in the frame and, if the present length of the frame exceeds the value MFS−1, the complete frame also exceeds the value MFS. If the cell is to be discarded, the first part of the frame should, if possible, be removed from the queue and the FPD_flag set. Otherwise, the PPD_flag is set.

For low-priority cells, that is to say cells which have the characteristic CLP=1, the handling operations to be carried out are similar to those described above. In the case of low-priority cells, the algorith appears as:

```
    IF (CLP=1)                     //comment: marked
frame
      THEN IF (first cell of frame)    //e.g.
Current_frame_length=0
         THEN   IF      (Logical_queue_length≧S_PPD_1)OR
                        [(Logical_queue_length>S_EPD_1)AND
                        (Buffer_check_1=TRUE)]
             THEN   discard_cell(P_cell)
                IF   end_of_frame(P_cell)=FALSE
                   THEN   FPD_flag=TRUE
             ELSE   append_cell(P_cell)
         IF       (subsequent cell of frame)    //e.g.
Current_frame_length>0
```

-continued

```
         THEN    IF      end_of_frame(P_cell)
             THEN   append_cell(P_cell)
             ELSE   IF      (Logical_queue_length≧S_PPD_1=
1)OR
                    [(Logical_queue_length>S_EPD_1)AND
                                (Buffer_check_1=TRUE)]OR
                                (Current_frame_length>MFS−1)
                 THEN   discard_cell (P_cell)
                        IFremove_last_frame
                        THEN    FPD_flag=TRUE
                        ELSE    PPD_flag=TRUE
                 ELSE   append_cell(P_cell)
```

However, the thresholds are defined as below for low-priority cells:

The variable Logical_queue_length is the length of the queue on arrival of the cell, and the variable Current_frame_length indicates the value of the variable when cells arrive. Initially, the variable Current_frame_length is set to 0. It is incremented by 1 when a cell is added to the queue. It is set to 0 when the end of the frame has arrived or when the last frame has been removed from the queue using the LPD algorithm. The first cell in the frame is generally recognized by the variable Current_frame_length=0.

We claim:

1. A method for removal of ATM cells from an ATM communications device, comprising:

providing a plurality of ATM cells, a plurality of which are in each case assigned to a common frame and which are stored in connection-specific queues;

providing a first algorithm by means of which, with the exception of a first and a last ATM cell in a frame, all newly arriving cells in the frame are removed;

providing a second algorithm by means of which all from a first cell to a last cell, are removed upon arrival in a queue from the ATM communications device;

at a start of a transmission process, indicating by a user a maximum number of ATM cells per frame, and transmitting the ATM cells using said maximum number; and when said maximum number is exceeded, discarding the associated frame or using the first algorithm, wherein no low-priority cells are stored for a connection if the length of the queue for said connection is of at least one size S_PPD_1=S_EPD_1+MFS, where S_EPD_1 is independent of said connection and a maximum number of cells per MFS depends on the connection, where PPD represents partial packet discard, EPD represents early packet discard, and MFS represents maximum frame size.

2. The method according to claim 1 wherein a queue-specific value S_EPD_0 is greater than a value S_PPD_1 and less than a value S_PPD_0+MFS where MFS is the maximum number of cells per frame, and the value S_PPD_0 represents a measure for a fixed upper limit for the queue, where MFS represents maximum frame size.

3. The method according to claim 2, wherein an EPD-flag and a FPD-flag are not set at a same time, where FPD represents full packet discard.

4. The method according to claim 3 wherein the values MFS+S_EPD 0 are stored and variables EPD_FLAG, FPD_FLAG and current_Frame_length are controlled for each connection, a variable current_Frame_length being a measure of a length of the current frame.

5. The method according to claim 1, wherein if a filling level of a buffer store is low, high-priority frames whose first cell has been transferred and whose frame length does not exceed the maximum number of cells per frame are not subjected to the first algorithm.

6. The method according to claim 1, wherein if a filling level of a buffer store is low, low-priority frames whose first cell has been transferred and whose frame length does not exceed the maximum number of cells per frame are not subjected to the first algorithm.

* * * * *